United States Patent [19]

Bergsten

[11] Patent Number: 4,626,016

[45] Date of Patent: Dec. 2, 1986

[54] STRUCTURAL AID FOR FACILITATING EGRESS FROM A VEHICLE

[76] Inventor: Ralph A. Bergsten, 1014 Cellana, Shell Point Village, Ft. Myers, Fla. 33908

[21] Appl. No.: 803,590

[22] Filed: Dec. 2, 1985

[51] Int. Cl.⁴ .............................................. B60R 27/00
[52] U.S. Cl. .................................... 296/1 R; 296/71; 16/111 R; 105/354
[58] Field of Search ................. 296/1 R, 71; 280/727; 16/111 R, DIG. 5, DIG. 12; 105/354

[56] References Cited

U.S. PATENT DOCUMENTS

| | | | |
|---|---|---|---|
| 2,222,590 | 11/1940 | Itzocovitz | 105/354 |
| 2,261,395 | 11/1941 | Claud-Mantle | 105/354 |
| 2,586,986 | 2/1952 | Orrison | 105/354 |
| 2,768,590 | 10/1956 | Otto et al. | 105/354 |
| 3,182,606 | 5/1965 | Osgood | 105/354 |
| 3,553,746 | 1/1971 | Seiger | 5/317 |
| 3,591,874 | 7/1971 | O'Kennedy | 5/81 |
| 3,739,793 | 6/1973 | Wilson | 135/45 |
| 4,072,339 | 2/1978 | Rothlisberger | 296/71 |
| 4,474,202 | 10/1984 | Blechner | 135/67 |

Primary Examiner—Robert R. Song
Attorney, Agent, or Firm—David C. Purdue

[57] ABSTRACT

A structural aid for assisting an occupant of a vehicle in rising from a seated position in the vehicle to a standing position outside the vehicle is disclosed. The structural aid includes sleeve means mounted in a door frame of the automobile and a handlebar insertable therein. The handlebar includes a sleeve-engaging portion adapted to be inserted in and withdrawn from the sleeve means and a handle portion graspable by the occupant. The sleeve means and the handlebar are configured so that when the sleeve-engaging portion is inserted in the sleeve means, the handlebar extends generally outwardly from the vehicle and the handle portion is positioned so as to be readily grasped by an occupant of the vehicle.

9 Claims, 3 Drawing Figures

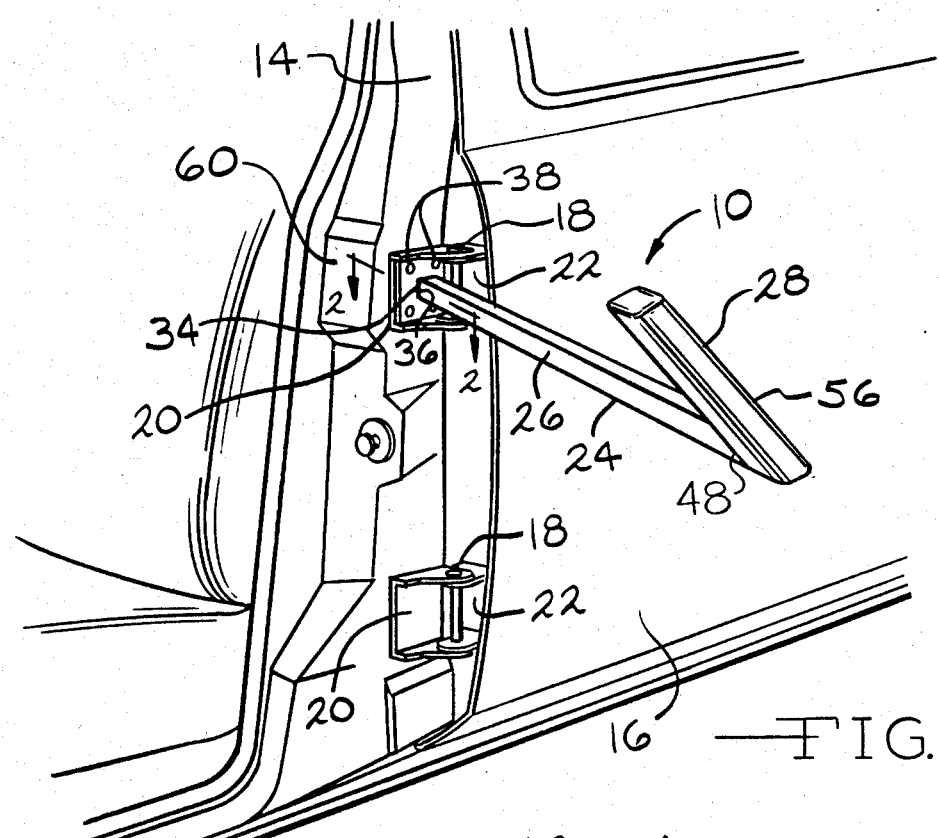
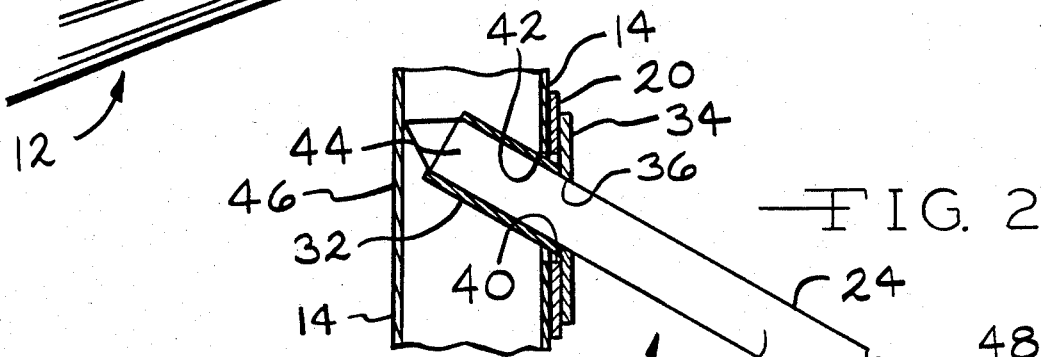
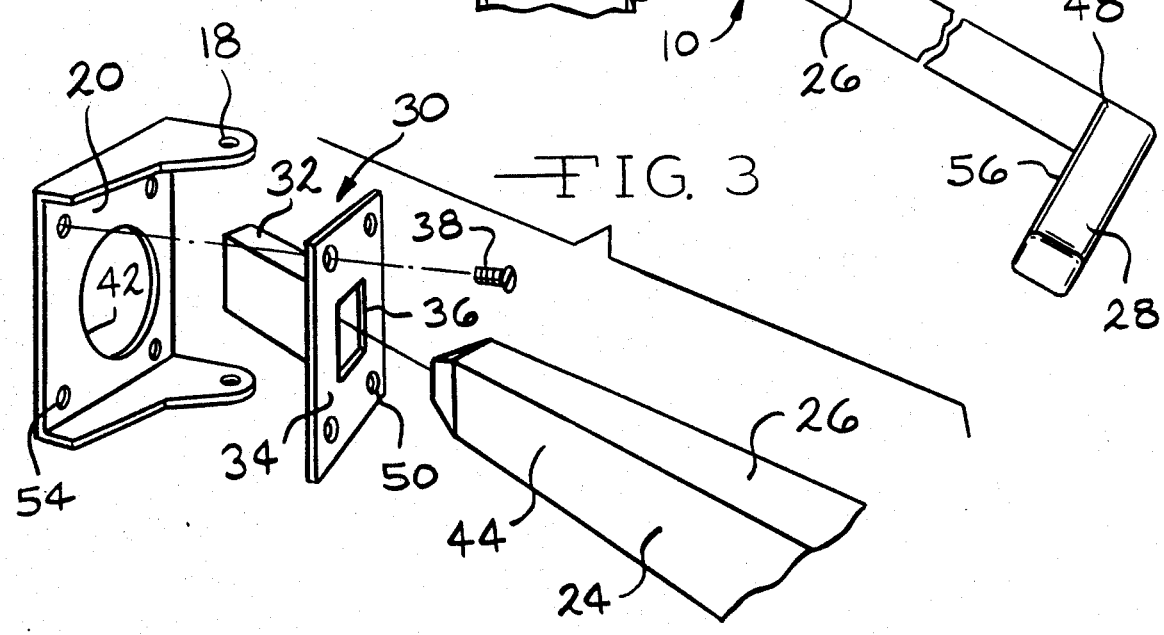

STRUCTURAL AID FOR FACILITATING EGRESS FROM A VEHICLE

BACKGROUND OF THE INVENTION

1. Field of the Invention

The present invention relates generally to an apparatus for assisting a person in achieving a standing position from a sitting position. More specifically, the present invention relates to an apparatus adapted to aid a person who is in a sitting position within a vehicle to exit such vehicle to a standing position.

2. Discussion of the Prior Art

A great deal of effort has been devoted to producing apparatus designed to assist a person to rise from a sitting position on a chair or a bed to a standing position. Examples of such apparatus are illustrated in U.S. Pat. Nos. 3,553,746, 3,591,874, 3,739,793, and 4,474,202. These patents disclose devices which are designed to rest on a floor adjacent or beneath a chair, bed, or similar object. U.S. Pat. No. 4,072,339 discloses a U-shaped handle apparatus secured to a door post of a vehicle, particularly a vehicle having a high ground clearance. The handle extends from the door post towards and into the interior of the vehicle. The handle apparatus is graspable by the hand of a vehicle entrant so that the entrant may apply a lifting force to the handle to assist himself into the vehicle.

Several prior art patents disclose assist straps or cords and means for mounting them on the interior of a passenger vehicle. U.S. Pat. No. 2,222,950 discloses an assist strap and spring-loaded means for mounting it on the interior of a vehicle. The spring-loaded mounting means maintain the assist strap, when not in use, in a retracted position. U.S. Pat. No. 2,261,395 discloses a similar spring-loaded mounting means for an assist cord. U.S. Pat. No. 3,182,606 discloses an assist strap and a mounting bracket which is particularly adapted for use in connection with what is referred to as a "hardtop convertible". Because assist straps are mounted on the interior of automobiles, they do not provide enough leverage to be of much assistance to one who is trying to attain a standing position from a seated position on an automobile seat. The same may be said of the handrail attachment disclosed in U.S. Pat. No. 2,768,590. The handrail attachment comprises supporting rods mounted in the interior of a motor vehicle, just above the doors thereof. U.S. Pat. No. 2,586,986 discloses several embodiments of a hand support for automobiles. The hand support is mounted on an automobile window rail to serve as an arm rest, as opposed to means for assisting one in entering or exiting the vehicle.

Despite the innovations disclosed in the foregoing patents, there is an unmet need for a structural aid specifically designed to assist one in the act of exiting a vehicle. The need is greatest in connection with automobiles which are low to the ground, because it is more difficult to stand up from a low seat than from a higher seat. There is a trend in the design of passenger automobiles towards smaller, more fuel-efficient cars. As a consequence of this trend, newer model passenger cars are closer to the ground than their predecessors. Even prior to the beginning of this trend, the act of exiting a vehicle has been a difficult one, particularly for persons having less than average strength or mobility in their legs and backs. The trend of designing smaller passenger automobiles has exacerbated the already difficult act of exiting an automobile because the seats in such automobiles are closer to the ground.

The frame of a car door does not provide adequate leverage to one who uses it to help himself or herself out of the car. The same is true of the automobile assist devices discussed above. An open car door is positioned to give better leverage, but the application of leverage thereto serves only to move the door towards a closed position.

SUMMARY OF THE INVENTION

The present invention relates to a structural aid for facilitating egress from a vehicle, such as an automobile. The structural aid includes a sleeve secured to a portion of an automobile door frame and a handlebar which includes a handle portion and a sleeve-engaging portion. The sleeve is adapted to be mounted on a vehicle frame so as not to interfere with the operation of the components of the vehicle. When the structural aid is to be used, the sleeve-engaging portion is inserted in the sleeve. The sleeve engaging portion of the structural aid and the sleeve are configured so that, when the former is inserted in the latter, the handlebar extends generally outwardly from the vehicle, and the handle is positioned so as to be easily grasped by an occupant of the vehicle. The sleeve-engaging portion can be withdrawn from the sleeve when the structural aid is not in use. The handlebar can be readily stowed in the passenger compartment of the vehicle when the structural aid is not in use.

Accordingly, it is an object of the present invention to provide a structural aid to assist a person in the act of exiting a vehicle from a sitting position to a standing position.

It is a further object of the present invention to provide such a structural aid which is easily used, reliable, and safe.

It is yet another object of the present invention to provide a structural aid for automobiles which does not interfere with the existing components of an automobile.

BRIEF DESCRIPTION OF THE DRAWINGS

FIG. 1 is a perspective view of a structural aid according to the present invention mounted for use in a passenger automobile.

FIG. 2 is a top plan view, partially in section, of the structural aid according to the invention, taken along the line 2—2 of FIG. 1.

FIG. 3 is an exploded perspective view of the components of the structural aid according to the present invention and a portion of the automobile.

DETAILED DESCRIPTION OF THE PREFERRED EMBODIMENT

The present invention is described below with reference to the appended figures. The following description is merely intended to enable one skilled in the art to practice the present invention which is limited only by the spirit and scope of the appended claims.

Referring now to FIG. 1, a structural aid according to the present invention is indicated generally at 10. A portion of a four-door automobile 12 including a door post 14 is also illustrated. A rear door 16 of the automobile 12 is mounted on the door post 14 by a pair of hinges 18. Each hinge 18 includes a door post flange 20 and a door flange 22. The structural aid 10 is mounted on the door post flange 20 of the upper hinge 18. The door post flange 20 is attached to the door post 14, and the door flange 22 is attached to the rear door 16. A pin 23 is provided to permit the door flange 22 and the rear door 16 to pivot relative to the door post flange 20 and the door post 14 in a well-known manner.

The structural aid 10 includes a handlebar, indicated generally at 24. In a preferred embodiment, the handlebar 24 includes an elongate portion 26 and a handle portion 28. The structural aid 10 further includes sleeve means, indicated generally at 30 in FIG. 3. The sleeve means 30 includes a sleeve 32 and a mounting plate 34 secured thereto, for example, by welding. An aperture 36 is provided through the mounting plate 34. The aperture 36 has substantially the same dimensions as the interior of the sleeve 32, which is secured to the mounting plate 34 around the aperture 36. The mounting plate 34 is secured to the door post flange 20 by fasteners 38 so that the sleeve 32 extends inwardly from the mounting plate 34 to the interior of the door post 14 (FIG. 2). The handlebar 24 extends outwardly from the mounting plate 34 so that the handle portion 28 is positioned to be readily graspable by a driver seated in the automobile 12. When the mounting plate 34 is mounted in the position shown in FIG. 1, the sleeve 30 (FIG. 2) extends through an aperture 40 formed in the door post flange 20 and through an aperture 42 formed in the door post 14.

The elongate portion 26 of the handlebar 24 includes a sleeve-engaging portion 44. The aperture 36 in the mounting plate 34 and the sleeve 32 are sized, relative to the sleeve-engaging portion 44, so that it may be readily inserted therein and removed therefrom. Specifically, the cross-sectional dimensions of the outer surface of the sleeve-engaging portion 44 should be only slightly smaller than the cross-sectional dimensions of the inner surface of the sleeve 32 and the aperture 36. As shown in FIG. 2, where the sleeve-engaging section 44 is inserted in the sleeve 30, the sleeve-engaging portion 44 abuts against an inner rear wall 46 of the door post 14. Thus, the inner rear wall 46 serves as a stop to limit the travel of the sleeve-engaging portion 44 as it is inserted in the sleeve 30. It will be appreciated that other types of stops may be utilized in a structural aid according to the present invention.

The mounting plate 34, in the embodiment shown in FIG. 1, is substantially parallel to the vertical side of the automobile 12. As shown in FIG. 2, the elongate portion 26 of the handlebar 24 forms an angle A relative to the mounting plate 34, as well as to the side of the automobile 12. The angle A is illustrated in FIG. 2 as being acute and is preferably in the range of 45° and 80°. The size of the angle A is determined by the structural relationship between the sleeve 32 and the mounting plate 34. When the angle A is an acute angle in the range of 45° to 80°, the handle portion 28 of the handlebar 24 is positioned so that it may be readily grasped by an occupant of the automobile 12.

The handle portion 28 of the handlebar 24 is secured to the elongate portion 26 thereof, for example, by welds indicated at 48. The handle portion 28 may be mounted at a substantially right angle relative to the elongate portion 26. When the sleeve-engaging portion 44 of the handlebar 24 is inserted in the sleeve 32, the handle portion 28 preferably extends towards the front of the automobile 12 from the elongate portion 26 so that the handle portion 28 forms an angle, relative to vertical, in the range of 20° to 70°.

The installation and use of the structural aid 10 will now be described in connection with FIG. 3. The sleeve 32 is secured, preferably by welding, to the mounting plate 34 so that the inner surface of the sleeve 32 is co-extensive with the aperture 36 provided in the mounting plate 34. The sleeve 32 and the mounting plate 34 are preferably formed of a strong material, such as steel stock. Holes 50 are drilled or otherwise formed through the mounting plate 34 to permit the passage of the fasteners 38 therethrough into engagement with the door post 14, as described above. The aperture 40 (FIG. 2) is drilled or otherwise formed through the door post flange 20, which is secured to the door post 14 (FIG. 1). The aperture 42 (FIG. 2) is drilled or otherwise formed through the door post 14 and aligns with the aperture 40 when the door post flange 14 is secured thereto. Apertures 54 (FIG. 3) are drilled or otherwise formed through the door post flange 20 to align with the holes 50 in the mounting plate 34. The apertures 54 are sized to receive the fasteners 38 therethrough. The sleeve 32 is inserted through the apertures 40 and 42 so that the apertures 50 align with the apertures 54. The mounting plate 34 is then secured to the door post flange 20 by fasteners 38. The sleeve 32 is now ready to receive the sleeve-engaging section 44 of the handlebar 24.

The handlebar 24 can be produced from two sections of bar stock. The sleeve-engaging section 44 and the elongate portion 26 of the handlebar 24 may consist of a single piece of bar stock cut to an appropriate length, for example, one to two feet. The handle portion 28 may also consist of a section of bar stock cut to an appropriate length, for example, one foot. Preferably, edges 56 on the handle portion 28 (FIG. 2) are rounded for comfort. The handle portion 28 is secured to the elongate portion 26, for example, by welds indicated at 48 to produce a handlebar 24. A strong aluminum alloy is a preferred material for the handlebar 24. Other suitable rigid materials may be employed.

The structural aid 10 is readied for use by inserting the sleeve-engaging portion 44 of the handlebar 24 into the sleeve 32, as shown in FIG. 1. The handle portion 28 of the handlebar 24 is thereby positioned to be readily grasped by an occupant of the automobile 12. The occupant may grasp the handle portion 28 with one or both hands and pull himself or herself to a standing position. The occupant may then remove the sleeve-engaging portion 44 of the handlebar 24 from the sleeve 32 and stow the handlebar 24 for later use.

In the embodiment of the structural aid 10 illustrated in FIGS. 1 through 3, the sleeve-engaging section 44 and the interior of the sleeve 32 have square cross sections. This configuration prevents rotation of the handlebar 24 when rotational torque is applied thereto, for example, through the handle portion 28. Although this configuration is preferred, it will be apparent to those skilled in the art that other rotation preventing configurations within the scope of the instant invention may be employed.

It will be appreciated that the sleeve means 30 may be mounted in a location other than that illustrated in FIG. 1. For example, the sleeve means 30 may be mounted on a surface 60 of the post 14. The surface 60 is substantially perpendicular to the side of the automobile 12. Indeed, the sleeve means 30 can be mounted anywhere on a car door frame where it will not interfere with the opening and closing of the associated car door. In a four-door automobile, however, the location disclosed in FIG. 1 for the mounting plate 34 of the sleeve means 30 is very practical.

What I claim:

1. In combination with a passenger vehicle, a structural aid comprising sleeve means mounted in a door frame and a handlebar having a first end and a second end, said handlebar comprising a sleeve-engaging portion proximate said first end and adapted to be inserted in and withdrawn from said sleeve means, a handle portion proximate said second end and adapted to be gripped by an occupant of the vehicle when said sleeve-engaging portion is inserted in said sleeve, said sleeve-engaging portion and said sleeve being configured so that, when the former is inserted in the latter, the handlebar extends generally outwardly from the vehicle and said handle portion is positioned so as to be graspable by the occupant.

2. A structural aid as claimed in claim 1 wherein said sleeve means comprises a sleeve secured to a mounting plate around an aperture therethrough.

3. A structural aid as claimed in claim 1 wherein said handlebar is disposed at an angle in the range of 45° to 80° relative to the side of the vehicle when the sleeve-engaging means is inserted in the sleeve means.

4. A structural aid as claimed in claim 2 wherein said sleeve means is mounted on a door post of the vehicle and the sleeve is disposed within the post.

5. A structural aid as claimed in claim 1 wherein the sleeve means and the sleeve-engaging means are configured so that, when the former is inserted in the latter, rotation of the handlebar is prevented.

6. A structural aid for facilitating egress by a person from a seated position in a vehicle to a standing position adjacent the vehicle, the vehicle including a frame, said structural aid comprising:
a handlebar including a rigid elongate portion having a first end and a second end and a rigid handle portion secured to said elongate portion proximate said second end;
sleeve means for receiving said first end of said handlebar therein, said sleeve means being sized to prevent rotation of said handlebar relative to said sleeve means when inserted therein; and
means for securing said sleeve means to the frame of the vehicle so that, when the first end of the handlebar is received in said sleeve means, said handlebar extends generally outwardly from the vehicle and said rigid handle portion is positioned to be grasped by a person in a seated position in the vehicle.

7. A structural aid as claimed in claim 6 wherein said sleeve means comprises a sleeve secured to a mounting plate around an aperture therethrough.

8. A structural aid as claimed in claim 6 wherein said elongate portion is disposed at an angle in the range of 45° to 80° relative to the side of the vehicle when said first end of said handlebar is received in said sleeve means.

9. A structural aid as claimed in claim 6 wherein said handle portion is disposed at a substantially right angle relative to said handlebar.

* * * * *